(12) United States Patent
Borumand et al.

(10) Patent No.: US 8,406,936 B1
(45) Date of Patent: Mar. 26, 2013

(54) MODULAR BATTERY NETWORK SYSTEM WITH LIFE-OPTIMAL POWER MANAGEMENT

(75) Inventors: Mori M. Borumand, Woodinville, WA (US); Ali R. Mansouri, Bothell, WA (US); John L. Vian, Renton, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 13/195,113

(22) Filed: Aug. 1, 2011

Related U.S. Application Data

(63) Continuation of application No. 11/758,606, filed on Jun. 5, 2007, now Pat. No. 8,010,250.

(51) Int. Cl.
*G05D 11/16* (2006.01)

(52) U.S. Cl. .............................. 700/295; 701/3; 700/286

(58) Field of Classification Search ...... 701/3; 700/286, 700/291, 292, 295, 297
See application file for complete search history.

(56) References Cited

U.S. PATENT DOCUMENTS

| | | | | |
|---|---|---|---|---|
| 5,568,052 A * | 10/1996 | Sway-Tin et al. | ............... | 324/435 |
| 6,046,513 A * | 4/2000 | Jouper et al. | ..................... | 307/31 |
| 6,104,967 A | 8/2000 | Hagen et al. | | |
| 6,633,802 B2 * | 10/2003 | Sodoski et al. | ................. | 701/36 |
| 6,652,330 B1 * | 11/2003 | Wasilewski | ....................... | 440/1 |
| 6,700,386 B2 * | 3/2004 | Egami | ............................. | 324/503 |
| 6,771,044 B1 * | 8/2004 | Vinciguerra et al. | ......... | 320/116 |
| 6,921,987 B2 * | 7/2005 | Marin-Martinod | ............. | 307/32 |
| 7,002,265 B2 * | 2/2006 | Potega | ........................... | 307/149 |
| 7,020,790 B2 * | 3/2006 | Mares | ............................ | 713/340 |
| 7,098,555 B2 * | 8/2006 | Glahn et al. | .................... | 307/32 |
| 7,099,784 B2 * | 8/2006 | Spitaels et al. | ................. | 702/57 |
| 7,173,347 B2 * | 2/2007 | Tani et al. | ..................... | 307/10.1 |
| 7,336,002 B2 * | 2/2008 | Kato et al. | .................... | 307/10.6 |
| 7,365,449 B2 * | 4/2008 | Marin-Martinod et al. | ... | 307/9.1 |
| 7,602,140 B2 * | 10/2009 | Asaumi et al. | ................. | 320/104 |
| 7,622,821 B2 * | 11/2009 | Mehrer et al. | .................. | 307/32 |
| 7,786,617 B2 * | 8/2010 | Paik et al. | ........................ | 307/64 |
| 7,795,752 B2 * | 9/2010 | Gorman et al. | ................ | 307/9.1 |
| 2002/0070705 A1 * | 6/2002 | Buchanan et al. | ............. | 320/116 |
| 2003/0085621 A1 * | 5/2003 | Potega | ............................ | 307/18 |

(Continued)

FOREIGN PATENT DOCUMENTS

| | | |
|---|---|---|
| EP | 1335473 A3 | 8/2003 |
| EP | 1777116 A1 | 4/2007 |

(Continued)

OTHER PUBLICATIONS

Combined Search and Examination Report Under Sections 17 and 13(3) dated Sep. 24, 2008 in Application No. GB0809509.3

(Continued)

*Primary Examiner* — Helal A Alghaim
(74) *Attorney, Agent, or Firm* — Hope Baldauff Hartman, LLC

(57) ABSTRACT

A system and methods for life optimal power management of a distributed or centralized battery network system for use in aircraft functions and subsystems are disclosed. The method determines power priority of the subsystems, and selectively distributes power from the battery network system to the subsystems based on the power priority. Concurrently with distributing power, the method manages the energy in the battery network system. To determine whether the battery power is sufficient for aircraft functions, the method also computes and indicates the actual available energy left in the battery network systems. With this approach, the system and methods can provide a persistent power supply in the event an unexpected battery failure occurs, thereby enabling the aircraft to safely maintain flight operability despite a battery failure.

18 Claims, 4 Drawing Sheets

U.S. PATENT DOCUMENTS

| | | | |
|---|---|---|---|
| 2004/0027094 A1 | 2/2004 | Sanders et al. | |
| 2004/0061380 A1* | 4/2004 | Hann et al. | 307/43 |
| 2004/0124703 A1* | 7/2004 | Tani et al. | 307/10.1 |
| 2004/0130292 A1* | 7/2004 | Buchanan et al. | 320/116 |
| 2004/0232769 A1* | 11/2004 | Pickering | 307/10.1 |
| 2004/0249521 A1* | 12/2004 | Petersen et al. | 701/3 |
| 2005/0099160 A1* | 5/2005 | Asaumi et al. | 320/132 |
| 2005/0137764 A1* | 6/2005 | Alvarez-Troncoso et al. | 701/36 |
| 2006/0097577 A1* | 5/2006 | Kato et al. | 307/10.1 |
| 2006/0143483 A1* | 6/2006 | Liebenow | 713/300 |
| 2007/0005205 A1* | 1/2007 | Bernardi et al. | 701/36 |
| 2007/0150215 A1* | 6/2007 | Spitaels et al. | 702/61 |
| 2008/0058998 A1* | 3/2008 | Breit | 700/295 |
| 2008/0122518 A1* | 5/2008 | Besser et al. | 327/518 |
| 2009/0309541 A1* | 12/2009 | Walrath | 320/107 |
| 2010/0121587 A1* | 5/2010 | Vian et al. | 702/63 |

FOREIGN PATENT DOCUMENTS

| | | |
|---|---|---|
| GB | 2290424 A | 12/1995 |

OTHER PUBLICATIONS

U.S. Official Action dated Apr. 29, 2010 in U.S. Appl. No. 11/758,606.

U.S. Official Action dated Oct. 15, 2010 in U.S. Appl. No. 11/758,606.

U.S. Notice of Allowance dated Mar. 11, 2011 in U.S. Appl. No. 11/758,606.

* cited by examiner

MODULAR BATTERY NETWORK SYSTEM WITH LIFE-OPTIMAL POWER MANAGEMENT

CROSS-REFERENCE TO RELATED APPLICATIONS

This application is a continuation of U.S. patent application Ser. No. 11/758,606, filed on Jun. 5, 2007, now U.S. Pat. No. 8,010,250 entitled "Life-Optimal Power Management Methods for Battery Network System," which is expressly incorporated by reference in its entirety.

TECHNICAL FIELD

Embodiments of the present disclosure relate generally to aircraft power supply systems, and more particularly to aircraft battery power supply systems.

BACKGROUND

Existing battery implementations and power architectures in modern aircraft applications are limiting the optimization of aircraft power system designs as well as directly affecting aircraft operation efficiency because of the following shortcomings: reduced functionality when an unscheduled battery failure occurs; the inability to skip an unscheduled maintenance event when a battery failure occurs; and the inability to allocate electrical loads and recharging profiles in a manner that extends the useful life of the battery system. Unexpected battery failures are a considerable economic issue in the aviation business because they may cause unscheduled maintenance, which may further lead to unscheduled operational delays requiring additional logistic support with unexpected related costs.

Existing aircraft designs are based on battery implementations/architectures that are unable to provide full and ordinary operability during an unscheduled battery failure. Furthermore, there is currently no battery/power architecture in an aircraft application that provides the ability to maintain operation when an unexpected battery failure occurs.

It is therefore desirable to have a battery power management system to optimally manage and distribute battery power supply so that the aircraft functions/subsystems can selectively be given battery power as needed. It is also desirable to enable flight operability even in the event an unexpected battery failure occurs. Other desirable features and characteristics, such as optimally maximizing the battery life to provide persistent battery power supply for flight operability will become apparent from the subsequent detailed description and the appended claims, taken in conjunction with the accompanying drawings and the foregoing technical field and background.

BRIEF SUMMARY

It should be appreciated that this Summary is provided to introduce a selection of concepts in a simplified form that are further described below in the Detailed Description. This Summary is not intended to be used to limit the scope of the claimed subject matter.

Systems and methods for life-optimal power management of a distributed or centralized battery network system for use in aircraft functions/subsystems are disclosed. According to one aspect of the disclosure, a modular energy storage network system includes any number of electrical energy storage devices arranged according to a centrally located network architecture. A power distribution module is coupled to the electrical energy storage devices. The power distribution module is configured to determine a power priority for each of the subsystems and selectively distribute power from the electrical energy storage devices according to the power priority of each subsystem. According to another aspect, the electrical energy storage devices are arranged according to a distributed network architecture.

According to another aspect of the disclosure, a method for managing power for an aircraft with a number of subsystems includes electrically coupling any number of modular battery networks and a power management module to the aircraft subsystems. A power priority for each of the subsystems is determined with the power management module and power is selectively distributed to the subsystems from the modular battery networks according to the power priorities.

The features, functions, and advantages that have been discussed can be achieved independently in various embodiments of the present disclosure or may be combined in yet other embodiments, further details of which can be seen with reference to the following description and drawings.

BRIEF DESCRIPTION OF THE DRAWINGS

A more complete understanding of the present disclosure may be derived by referring to the detailed description and claims when considered in conjunction with the following figures, wherein like reference numbers refer to similar elements throughout the figures.

DETAILED DESCRIPTION

Figure 1:
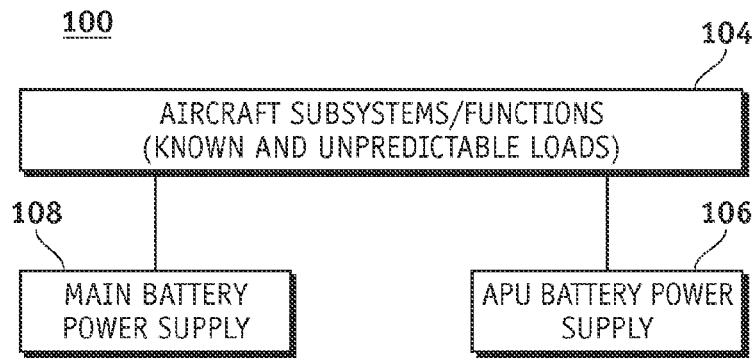
FIG. 1 is a schematic representation of a simplified typical battery power supply architecture of an aircraft.

The following detailed description is merely illustrative in nature and is not intended to limit the embodiments of the disclosure or the application and uses of such embodiments. Furthermore, there is no embodiment of the disclosure to be bound by any expressed or implied theory presented in the preceding technical field, background, brief summary or the following detailed description.

Embodiments of the disclosure may be described herein in terms of functional and/or logical block components and various processing steps. It should be appreciated that such block components may be realized by any number of hardware, software, and/or firmware components configured to perform the specified functions. For example, an embodiment of the disclosure may employ various integrated circuit components, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of power system and/or aircraft configurations, and that the system described herein is merely one example embodiment of the disclosure.

For the sake of brevity, conventional techniques and components related to signal processing, aircraft battery power systems and control, and other functional aspects of the systems and the individual operating components of the systems may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the disclosure.

The following description refers to elements or nodes or features being "connected" or "coupled" together. As used herein, unless expressly stated otherwise, "connected" means that one element/node/feature is directly joined to or directly communicates with another element/node/feature, and not necessarily mechanically. Likewise, unless expressly stated otherwise, "coupled" means that one element/node/feature is directly or indirectly joined to or directly or indirectly communicates with another element/node/feature, and not necessarily mechanically. Thus, although the schematics shown in the figures depict example arrangements of elements, additional intervening elements, devices, features, or components may be present in an embodiment of the disclosure (assuming that the functionality of the system is not adversely affected).

The embodiments described herein relate to a power management system with a battery network system for an aircraft. The power management system may be referred to as a "life-optimal" system because it extends life optimally for each battery and distributes persistent battery power supply in an event where an unexpected battery failure occurs. In this context, the power management techniques described here are applicable to provide persistent battery power for the operation of aircraft systems and subsystems that depend on a battery supply. The embodiments described herein are not limited to such aircraft applications, and the techniques described herein may also be utilized in other applications.

FIG. 1 is a schematic representation of a simplified typical existing battery power supply architecture 100 for an aircraft. The typical existing battery power supply architecture 100 includes: aircraft subsystems/functions 104, an auxiliary power unit (APU) battery power supply 106 coupled to the aircraft subsystems/functions 104, and a main battery power supply 108 coupled to the aircraft subsystems 104. The aircraft functions 104 include known and unknown loads such as, without limitation, standby emergency loads, flight controls, emergency lighting, APU starting, data and voice recorder system, and electric brakes. The battery power supplies 106/108 are typically dedicated to power specific aircraft functions and operate with an assumed capacity.

Capacity is an amount of current a fully charged battery can supply for a given period of time without having the terminal voltage fall below a certain voltage at a given temperature. Battery capacity refers to the total amount of energy stored within a battery. Rated capacity is in ampere-hours (amp-hour), which is the product of the current times the number of hours to total discharge. There are a number of factors that dictate the capacity of a given battery, for example: size (the volume and plate area of a battery increases with capacity); temperature (as a battery gets colder its capacity decreases); cut off voltage (to prevent damage, the cut-off voltage should be limited to a certain voltage); discharge rate (this is the rate of discharge, measured in amperes—as the discharge rate goes up, the capacity goes down); and history (deep discharging, excessive cycling, age, over charging, and under charging all reduce capacity).

If the battery power supplies 106/108 fail (e.g., the assumed capacity is not enough to power the specific aircraft function) their respective aircraft functions 104 may be unable to maintain operability. As used herein, an "assumed capacity" is a minimum or nominal capacity that is specified by the manufacturer, vendor, certification body, or testing agency. The assumed capacity may be based on a rated capacity (amp-hour) established by the battery council international (BCI). The assumed capacity may therefore be insufficient to power the intended aircraft function(s) 104 since batteries may lose capacity for the reasons explained above.

For example, the APU battery power supply 106 is primarily a power source dedicated to start an APU turbine (which is used to start the aircraft engine) when no other power source is available to do so. The APU battery power supply 106 may also be utilized to supplement the main battery power supply 108 for such things such as extended-range twin-engine operations (ETOPS), and to increase towing time on battery-only power. Thus if the APU battery power supply 106 fails (e.g., because of a lack of sufficient battery capacity to power the aircraft systems), then the respective subsystems (e.g., the APU start function) will be unable to maintain operability.

The main battery power supply 108 is the primary backup power source/electrical energy storage device for the aircraft. It is typically dedicated to, for example: special on-ground operations such as towing, various ground tests when no other airplane power is available, powering essential equipment until other power sources (e.g., APU or ram air turbine) can be turned on, and keeping essential equipment powered when other power sources have been removed, have been disabled, or have failed, such as during loss of AC power or engine generators. The main battery power supply 108 may also be dedicated to support special functions such as being a backup power source for an uninterruptible power supply for the flight controls and the fill-in/backup power source for the electric brakes. Thus, if the main battery power supply 108 fails (i.e., has a lack of battery capacity), then the respective subsystems are unable to maintain operability.

In summary, the existing battery power supply architecture in aircraft applications are limiting the optimization of aircraft power system designs as well as directly affecting aircraft operability because of the inability to maintain operability when an unscheduled battery failure occurs.

The embodiments described below provide a life-optimal power management system with a battery network architecture that is fully independent of (i.e., not dedicated to) member subsystems and load specific functions where the state of battery capacity is known (i.e., not assumed, as compared to the typical existing architecture 100). The life-optimal power management described herein provides an ability to maintain operability when an unscheduled battery failure occurs by optimally allocating and tasking (i.e., commanding to provide power) the batteries so that the aircraft functions 104 can be given power priority based on their specific power requirements and sequence of operations. Additionally, the life-optimal power management scheme provides the capability to selectively charge/discharge each battery to maximize the life of each battery and to bypass a failed battery. In this regard, a battery network system can provide persistent power supply in the event an unexpected battery failure occurs, thereby enabling the aircraft to maintain operability (e.g., dispatch) in spite of partial battery failure. The disclosed embodiments include a life-optimal power management system with a battery network that utilizes either a centrally located or distributed battery network architecture.

Figure 2:
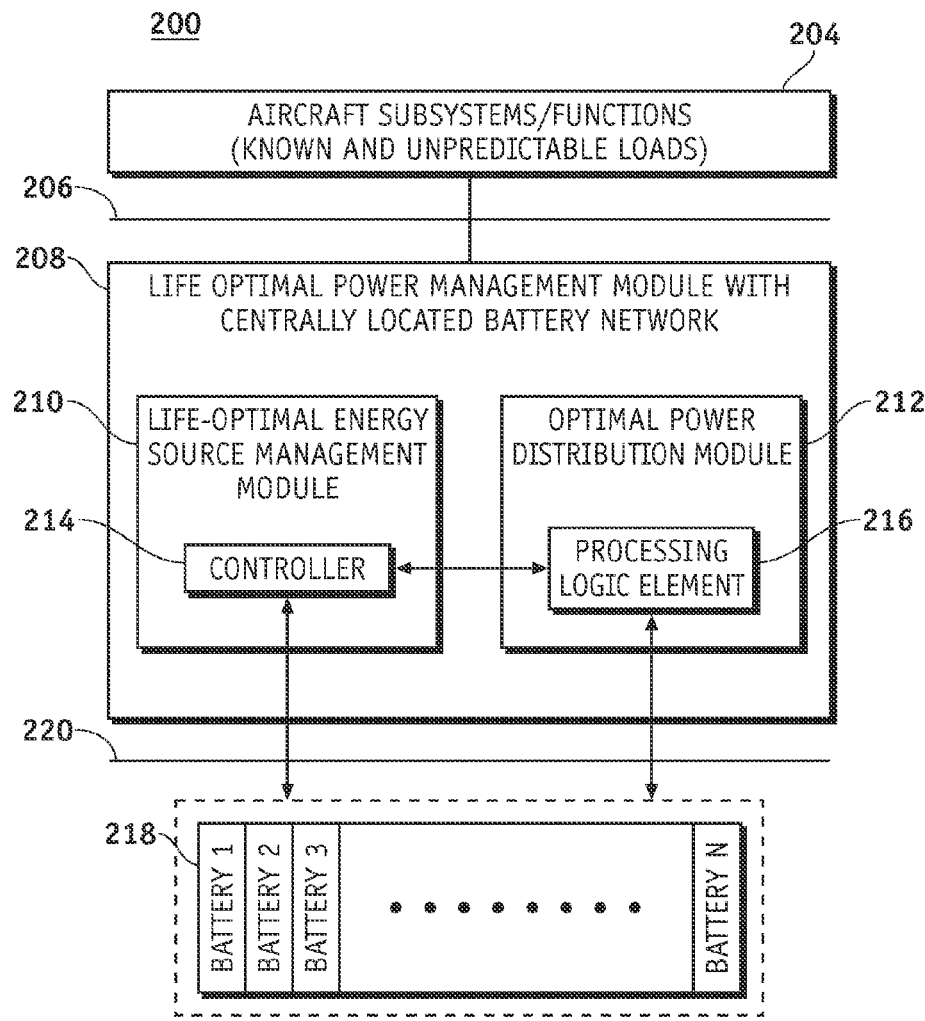
FIG. 2 is a schematic representation of a power management system with a centrally located battery network system for an aircraft.

FIG. 2 is a schematic representation of a life-optimal power management system 200 with centrally located battery network architecture suitable for aircraft operations. System 200 can be applied to any number of battery network configurations for an aircraft, and system 200 is depicted in a generic manner to illustrate its deployment flexibility. In this example, the system 200 may include a centralized power management module 208 and a centrally located battery network system 218. These terms are used herein for convenience of description and are not intended to limit or restrict the scope or application of the disclosure in any way. In practice, system 200 selectively distributes power from the centrally located battery network system 218 to aircraft functions 204 (which may be configured and/or realized as explained above), manages/controls the energy in the centrally located battery network system 218, and determines what combination of batteries in the centrally located battery network system 218 are sufficient for aircraft operations such as dispatch (takeoff, cruise, and landing) as explained below. Power management module 208 may include an energy source management module 210 having a controller 214, and a power distribution module 212 having a processing logic element 216.

In a practical deployment, power management module 208 can be realized as a computer, located anywhere on-board the aircraft suitable for operation with system 200. For example, without limitation, power management module 208 may be located in a nose of aircraft, and the like. The power management module 208 may supply power to the aircraft function 204 via a battery power bus 206.

Controller 214 is configured to manage/control the centralized battery network system 218 in accordance with embodiments described herein. The controller 214 may be implemented, without limitation, as part of an aircraft computing module, a centralized aircraft processor, a subsystem computing module devoted to the life optimal power management arrangement, or the like. The controller 214 may generally be a software-controlled device. In operation, the controller 214 receives signals indicative of operating status parameters from the centralized battery network system 218 via sensors and processors in the batteries (not shown in FIG. 2).

Battery capacity for a given size battery, as explained above, depends on temperature, cut off voltage, charge/discharge and the like, and health of the battery depends on the battery capacity relative to its initial specification. In this regard, the operating status parameters may indicate, for example, the current percentage of the assumed (specified) capacity for the battery or battery network. The maximum actual capacity (health) of a battery is determined by measuring voltage, current, and temperature measurements during charge and discharge cycles, and comparing those measurements to data sets known to represent various levels of health. Based on the received signals, the controller 214 determines whether a specific battery will be replenished (charged) or used (discharged) at an optimal rate. Under normal conditions, controller 214 communicates with each of the batteries in the centrally located battery network system 218 over an intra battery network 220 and cooperates with individual battery sensors and processors/controller (not shown in FIG. 2) to coordinate battery monitoring and control operation. For example, the controller 214 monitors battery parameters such as potential, current, voltage and temperature for each of the batteries in the centrally located battery network system 218 by obtaining the battery parameters from each of the battery sensors and processors, and the controller 214 determines from the battery parameters a state of health and available capacity for each battery.

The processing logic element 216 may be coupled to the controller 214 and is configured to control the selective distribution of power from the batteries in the centralized battery network system 218 to the aircraft functions 204 based on the power priority of the aircraft functions 204 and the available capacity of each of the batteries. For example, having enough battery power to operate the electric brake is high priority, while providing phone services for the passengers may be of low priority. Processing logic element 216 may include any number of distinct processing modules or components that are configured to perform the tasks, processes, and operations described in more detail herein. Although only one processing block is shown in FIG. 2, a practical implementation may utilize any number of distinct physical and/or logical processors, which may be dispersed throughout system 200. In practice, the processing logic element 216 may be implemented or performed, without limitation, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. A processor may be realized as a microprocessor, a controller, a microcontroller, or a state machine. A processor may also be implemented as a combination of computing devices, e.g., a combination of a digital signal processor and a microprocessor, a plurality of microprocessors, one or more microprocessors in conjunction with a digital signal processor core, or any other such configuration.

Figure 3:
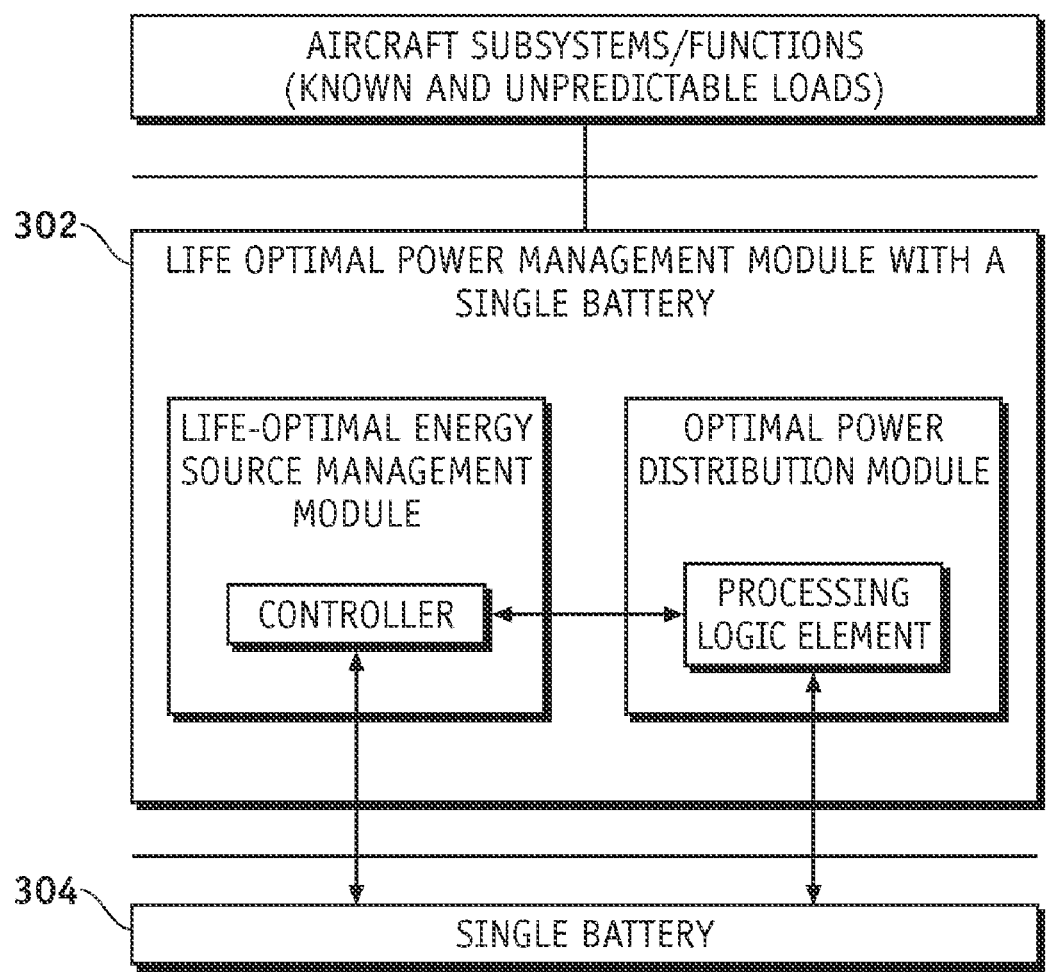
FIG. 3 is a schematic representation of a power management system with a single battery for an aircraft.

Centrally located battery network system 218 is configured to store electrical energy and supply power to the aircraft functions 204 as explained in the context of FIG. 5 below. The centrally located battery network system 218 may include one to more than one, (1-N) batteries configured in any arrangement to achieve a desired voltage and current rating suitable for operation with the system 200. Alternatively, as shown in FIG. 3, a life-optimal power management module 302 may include one battery 304. However using multiple batteries provides for increased design flexibility and ease of maintenance. Batteries 1-N may be any battery type known in the art, such as, without limitation, lithium-ion, nickel-metal-hydride, nickel-cadmium, and the like. In another embodiment, a distributed battery network may be used. A distributed network approach generally provides additional design flexibility compared to a centrally located battery network system 218.

Figure 4:
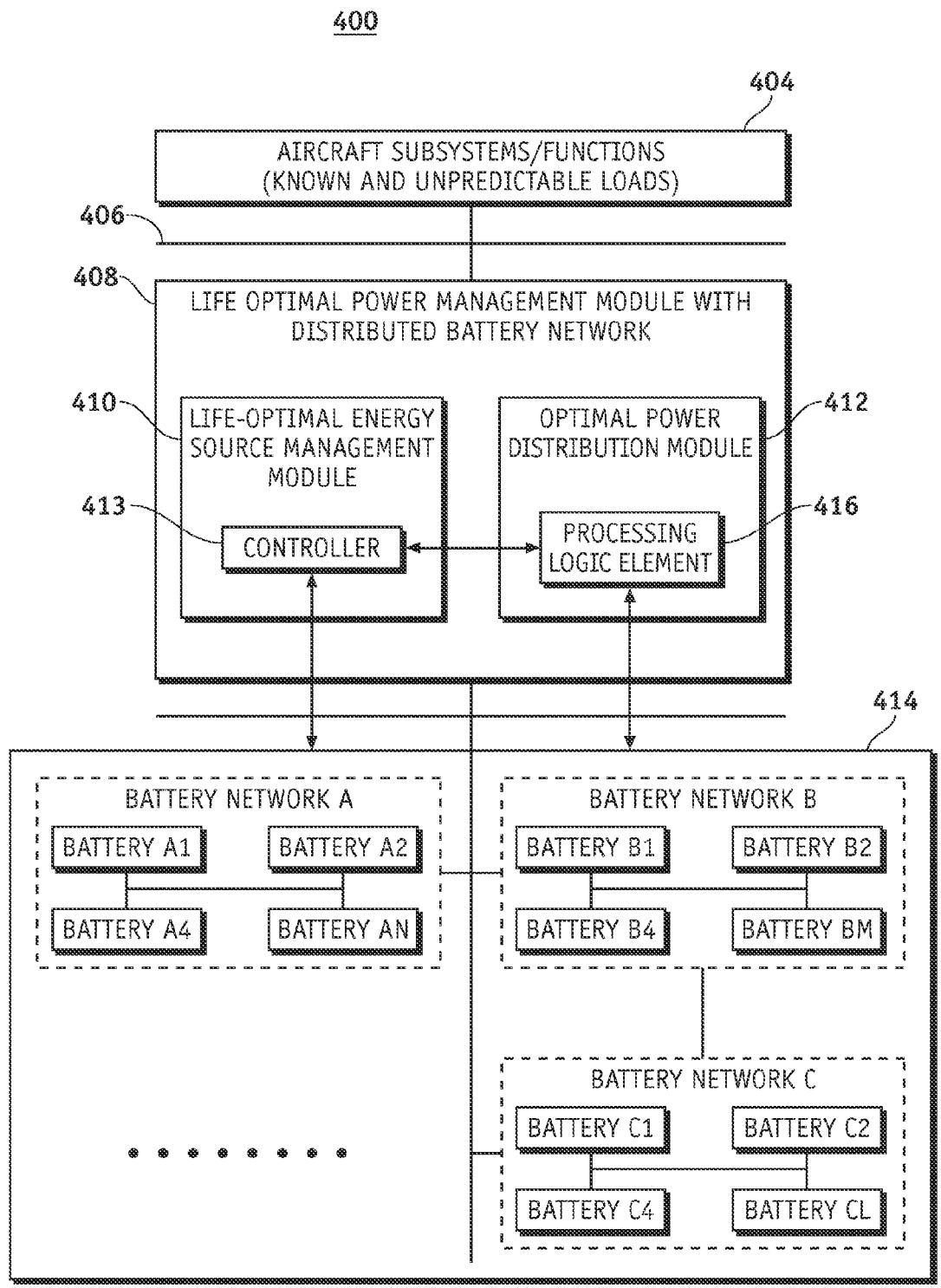
FIG. 4 is a schematic representation of a power management system with a distributed battery network architecture for an aircraft.

FIG. 4 shows a life-optimal power management system 400 with a battery network distributed among various locations in an aircraft according to another system embodiment. The system 400 described herein can be applied to any number of battery network configurations for an aircraft, and system 400 is depicted in a generic manner to illustrate its deployment flexibility. In this example, the system 400 may include: a power management module 408, and a battery network system 414 distributed among various locations. These terms are used herein for convenience of description and are not intended to limit or restrict the scope or application of the disclosure in any way. System 400 may share common features with system 200-300 and may have a structure that is similar to system 200-300. Accordingly, the configuration and operation of these components will not be redundantly described herein.

Battery network system 414 is coupled to the power management module 408, and is configured to store electrical energy and supply power to the aircraft functions 404. The distributed battery network system 414 may include any number of battery networks distributed among various locations arranged in any configuration to achieve a desired voltage and current rating suitable for operation with the system 400. For example, a distributed battery network system may involve connecting a number of self-contained energy storage devices together in series and/or a parallel arrangement. The distributed battery network system 414 may include: a battery network A coupled to a battery network B, and a battery network C coupled to the battery network A-B. Each battery network A-C may include any number of batteries connected in series and/or parallel arrangement to achieve a desired voltage and current rating. For example, as shown in FIG. 4, battery networks A-C each may include batteries $A_1$-$A_N$, $B_1$-$B_M$, and $C_1$-$C_L$ receptively, where N, M, and L may be any number suitable for operation with system 400.

Both the distributed battery network system 414 and the centrally located battery network system 218 provide a sufficient number of batteries (battery redundancy) to provide persistent battery power to aircraft functions 404/204 in spite of a battery failure/a partial battery failure. However, the centrally located battery network system 218 generally provides additional ease of maintenance (since the batteries are located in proximity of each other). Compared to battery network systems 218/414, the life-optimal power management module 302 with one battery 304 generally provides improvement in size, weight, and cost of the battery since the batteries are consolidated in to a single battery. Depending on aircraft design characteristics and operational requirements, either battery network systems 218/414, or the battery 304 may be suitably utilized to optimally manage and distribute battery power to aircraft functions 404/204 as described herein.

Figure 5:
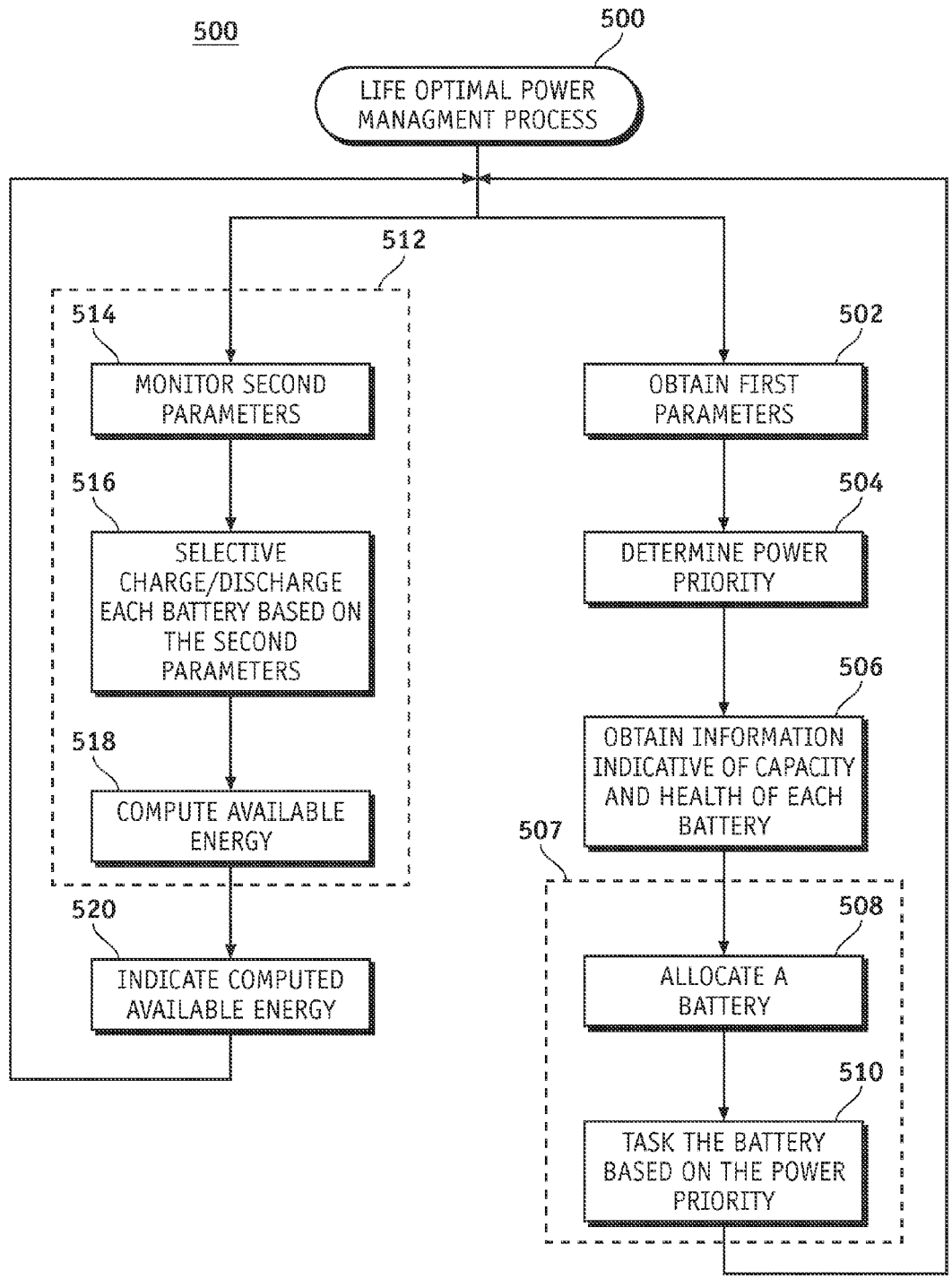
FIG. 5 is a flowchart illustrating a power management process for an aircraft.

FIG. 5 is a flow chart illustrating a power management process 500 for an aircraft according to an example embodiment of the disclosure. Process 500 selectively distributes power from the electrical energy storage devices to the aircraft subsystems so that the subsystems can be given power based on their functional criticality. As used here, "functional criticality" represents the relative importance of a given subsystem for normal operation of the aircraft and to meet regulatory requirements. For example, without limitation, APU start power has relatively little functional criticality, while the electric brake system has relatively significant functional criticality. As another example, without limitation, the ground battery power may be important for ignition power to allow for engine start, while providing power to the flight deck clock may be of low priority. Process 500 also manages the electrical energy storage devices to provide a persistent power supply in an event an unexpected battery failure occurs, and thereby enables the aircraft to maintain flight operability even if a battery failure occurs. The various tasks performed in connection with process 500 may be performed by software, hardware, firmware, or any combination thereof. It should be appreciated that process 500 may include any number of additional or alternative tasks, the tasks shown in FIG. 5 need not be performed in the illustrated order, and process 500 may be incorporated into a more comprehensive procedure or process having additional functionality not described in detail herein. For illustrative purposes, the following description of process 500 may refer to elements mentioned above in connection with FIGS. 2-4. In practical embodiments, portions of process 500 may be performed by different elements of a system 200-400, e.g., a life-optimal power management module with a centrally located or distributed battery network system.

A life-optimal power management process 500 may begin by obtaining functional first parameters (task 502) indicative of functional criticality (i.e., relative importance of powering) of each of the aircraft function. In practice, these first parameters are obtained from a table look-up. The table look-up may be stored in the power management module, a computer on-board the aircraft, a computer in a remote location from the aircraft, and the like. The first parameters may be predetermined, may be updated in real time, or may be forecast based on future flight profile needs. The first parameters may be, without limitation, specific functions, sequences of operation, and/or forecasted power requirements for operating each of the subsystems. For example, as explained above, the aircraft subsystems include known and predicted future loads such as, without limitation, standby emergency loads, flight controls, emergency lighting, APU starting, data and voice recorder system, and electric brakes. The relative importance of powering each of these loads may vary depending upon a required sequence of operation to complete certain flight plans (i.e., flight operation requirements). For example, having enough battery power to start the APU is important for dispatch operation, while providing passenger reading lights may be of low priority relative to other subsystems such as emergency lighting. In operation, the power distribution module provides persistent power to each of the aircraft functions based on their level of criticality, so that each aircraft function has sufficient power to support completion of a sequence of operation. Generally the sequence of operation may include, without limitation, non-critical predictable loads (e.g., flight deck clock), critical predictable loads (e.g., electrical brake systems), critical unpredictable loads (e.g., engine fire detection), and non-critical unpredictable loads (e.g., APU starting). The sequence of operation may be assessed by the pilot per a given situation or may be predetermined based on a certain flight plan/aircraft operation. For example, a sequence of operation for starting the aircraft engine may include: ignition for about 5 min, APU power start, fuel pump on, engine start up sequences, etc. In this regard, process 500 determines a power priority of each of the subsystems based on the first parameters (task 504), obtains information indicative of operational status parameters of each battery such as capacity and health of each battery (task 506) from the controller (as explained below), and selectively distributes power from the batteries to the subsystems based on the power priority and operational status parameters (task 507).

To distribute power, process 500 then allocates batteries (i.e., assign an individual battery to a given subsystem) based on which, battery or batteries have sufficient charge/capacity to supply power to the subsystems (task 508), and tasks (i.e., command to provide power) the batteries to provide power to the subsystems based on the power priority of the subsystems (task 510). For example, process 500 may determine that dispatching is among the aircraft functions with highest power priority. To dispatch the aircraft, a certain battery power must be available to start the APU. In this regard, power distribution module receives information indicative of the capacity and health of each battery from the controller, and allocates a battery or batteries in a battery network system that has sufficient capacity to power the APU start subsystem. The power distribution module then tasks the battery or batteries by sending command signals to the battery processor via a communication bus to request power for the APU start subsystems.

Concurrently with distributing power, process 500 manages/controls the battery network system based on monitored operating status parameters (second parameters) of the batteries (task 512). The operating status parameters may include, without limitation, charging/discharging voltage, relative discharging rate (e.g., time, current state), and remaining life of each of the batteries in the battery network system. In this regard, process 500 monitors a number of conditions including the potential, voltage, current, and temperature of each battery to determine operating status parameters and health of the batteries (task 514). Based on the health of each battery, process 500 selectively charges/discharges each battery (task 516). Excessive number of charge/discharge cycles, or inappropriate charge/discharge rate, may reduce the useful life of the batteries. In this regard, charging takes place in response to acquired battery health information. In other words, if voltage is low, then a battery should be charged. If charging is needed, a charge request command from the controller is issued to the battery processor. In this regard, lower battery failure rate is achieved since the battery is charged/discharged in an optimal manner. However, if a battery fails, process 500 bypasses the defective battery within the network in response to a bypass control signal from the battery processor. In other words, the system will simply "ignore" or not consider the bypassed battery for purposes of powering any of the loads.

To determine whether the batteries have sufficient capacity for aircraft operations, process 500 also computes available energy/capacity (amp-hours) in each of the batteries (task 518). This differs from conventional systems that always assume that a particular capacity exists for each battery. In practice, task 518 is performed by the controller, and task 518 is accomplished by monitoring temperature, battery terminals voltage, cut off voltage, discharge rate (current in reverse direction per unit of time), and discharge duty for each battery and computing the capacity. As explained above, health of the battery depends on the battery capacity relative to its initial specification. In this regard, process 500 determines available capacity in each battery by and computes a percentage change relative to the initial specification. The maximum actual capacity capability (health) of a battery is determined by measuring parameters such as voltage, current, and temperature during charge and discharge cycles, and comparing those measurements to data sets known to represent various levels of health. Total available capacity is then computed by adding the available capacity for each of the batteries.

Additionally, process 500 indicates the available energy/total available energy (task 520) to a pilot or crew of the aircraft so that, if necessary, a decision can be made by the pilot or the crew of the aircraft regarding aircraft operations (i.e., plan to operate according to the actual battery power available). The indication may be in the form of a variable number, or a graphical chart displayed on the cockpit instrumentation panels, or the like.

With this approach, since the performance and condition of each battery in the battery network system is known, the systems and method can provide life-optimal battery usage, and persistent battery power supply in the event an unexpected battery failure occurs. Accordingly, probability of battery failure, cost of battery maintenance, and cost of flight cancellation due unexpected battery failure may be reduced.

While at least one example embodiment has been presented in the foregoing detailed description, it should be appreciated that a vast number of variations exist. It should also be appreciated that the example embodiment or embodiments described herein are not intended to limit the scope, applicability, or configuration of the disclosure in any way. Rather, the foregoing detailed description will provide those skilled in the art with a convenient road map for implementing the described embodiment or embodiments. It should be understood that various changes can be made in the function and arrangement of elements without departing from the scope of the disclosure, where the scope of the embodiments of the disclosure is defined by the claims, which includes known equivalents and foreseeable equivalents at the time of filing this patent application.

What is claimed is:

1. A modular energy storage network system for an aircraft having a plurality of one of subsystems and functions, the system comprising:
    a plurality of distributed modular battery networks, each modular battery network being at a location distinct from other battery networks, each modular battery network including at least one self-contained energy storage device, each modular battery network being fully independent from each of the plurality of one of subsystems and functions;
    a power distribution module coupled to each of the plurality of distributed modular battery networks, the power distribution module being configured to:
        determine a total available capacity for each modular battery network by adding an available capacity for each battery in a respective modular battery network;
        determine a power priority for each of the plurality of one of subsystems and functions; and
        selectively distribute power from the plurality of distributed modular battery networks to at least one of the plurality of one of subsystems and functions based on the power priority for each of the plurality of one of subsystems and functions and the total available capacity for each modular battery network.

2. The modular energy storage network system of claim 1, further comprising:
    at least one operating status parameter associated with each of the plurality of distributed modular battery networks; and
    an energy source management module coupled to each of the plurality of distributed modular battery networks, the energy source management module being configured to manage health of each of the plurality of distributed modular battery networks based on the at least one operating status parameter of each of the plurality of distributed modular battery networks.

3. The modular energy storage network system according to claim 2, wherein the energy source management module is further configured to:
    monitor the operating status parameters of each of the plurality of distributed modular battery networks;
    selectively charge/discharge each of the plurality of distributed modular battery networks based on the at least one operating status parameter;
    compute available energy in each of the plurality of distributed modular battery networks based on the at least one operating status parameter; and
    indicate the available energy.

4. The modular energy storage network system according to claim 2, wherein the at least one operating status parameter comprises:
    a charging/discharging rate for each of the plurality of distributed modular battery networks;
    a relative discharging rate for each of the plurality of distributed modular battery networks; and
    a remaining life for each of the plurality of distributed modular battery networks.

5. The modular energy storage network system of claim 1, wherein at least one of the plurality of distributed modular battery networks comprises a single battery.

6. The modular energy storage network system of claim 1, wherein at least one of the plurality of distributed modular battery networks comprises a plurality of batteries.

7. The modular energy storage network system according to claim 6, wherein the power distribution module is further configured to:
- allocate the plurality of batteries based on which of the plurality of batteries have sufficient capacity to supply power to at least one of the plurality of one of subsystems and functions; and
- provide power from the plurality of batteries to at least one of the plurality of one of subsystems and functions in response to the allocation and in response to the power priority for the at least one of the plurality of one of subsystems and functions.

8. The modular energy storage network system according to claim 1, wherein the power priority being based on:
- a sequence of operation of the plurality of one of subsystems and functions; and
- a forecasted power requirement for operating each of the plurality of one of subsystems and functions.

9. A modular energy storage network system for an aircraft having a plurality of one of subsystems and functions, the system comprising:
- a plurality of distributed modular battery networks, each modular battery network being at a location distinct from other battery networks, each modular battery network including at least one self-contained energy storage device, each modular battery network being fully independent from each of the plurality of one of subsystems and functions and at least two of the modular battery networks of the plurality of distributed modular battery networks connected in series;
- a power distribution module coupled to each of the plurality of distributed modular battery networks, the power distribution module being configured to:
  - determine a total available capacity for each modular battery network by adding an available capacity for each battery in a respective modular battery network;
  - determine a power priority for each of the plurality of one of subsystems and functions; and
  - selectively distribute power from the plurality of distributed modular battery networks to at least one of the plurality of one of subsystems and functions based on the power priority for each of the plurality of one of subsystems and functions.

10. The modular energy storage network system of claim 9, wherein at least one of the plurality of distributed modular battery networks comprises a plurality of batteries, and
- wherein the plurality of distributed modular battery networks comprise a plurality of batteries connected to one another in one of series and parallel.

11. The modular energy storage network system of claim 9, further comprising:
- at least one operating status parameter associated with each of the plurality of distributed modular battery networks; and
- an energy source management module coupled to the plurality of distributed modular battery networks, the energy source management module being configured to manage health of the plurality of distributed modular battery networks based on the at least one operating status parameter of each of the plurality of distributed modular battery networks.

12. The modular energy storage network system of claim 9, wherein the power distribution module is further configured to:
- allocate the plurality of distributed modular battery networks based on which of the plurality of distributed modular battery networks have sufficient capacity to supply power to at least one of the plurality of one of subsystems and functions; and
- provide power from the plurality of distributed modular battery networks to the at least one of the plurality of one of subsystems and functions in response to the allocation and in response to the power priority for each of the plurality of one of subsystems and functions.

13. A computer-implemented method for managing power for an aircraft having a plurality of one of subsystems and functions, the method comprising:
- providing a computing device;
- electrically coupling at least one of a plurality of distributed modular battery networks and a power management module to at least one of the plurality of one of subsystems and functions of the aircraft, each of the plurality of distributed modular battery networks being fully independent from each of the plurality of one of subsystems and functions;
- determining, by the computing device, a total available capacity for each of the plurality of distributed modular battery networks by adding an available capacity for each battery in a respective modular battery network, and a power priority for each of the plurality of one of subsystems and functions with the power management module; and
- controlling, by the computing device, the selective distribution of power from the at least one of a plurality of distributed modular battery networks to the at least one of the plurality of one of subsystems and functions based on the power priority for each of the plurality of one of subsystems and functions and the total available capacity for each of the plurality of distributed modular battery networks.

14. The method of claim 13, wherein the at least one of the plurality of distributed modular battery networks comprises a plurality of batteries, where each modular battery network being at a location distinct from other battery networks.

15. The method of claim 13, wherein the at least one of the plurality of distributed modular battery networks comprises one or more batteries connected to one another in series or parallel, and
- wherein at least two of the plurality of distributed battery networks being connected to one other in one of series and parallel.

16. The method of claim 13, further comprising:
- determining, by the computing device, a plurality of first parameters related to functional criticality of the plurality of one of subsystems and functions, wherein determining the power priority for each of the plurality of one of subsystems and functions is based on the plurality of first parameters;
- monitoring, by the computing device, a plurality of second parameters related to operating status of a plurality of batteries of the at least one of the plurality of distributed modular battery networks;
- controlling, by the computing device, charging/discharging selectively at least one of the plurality of batteries in response to the second parameters;
- computing, by the computing device, based on the second parameters, available energy in the plurality of batteries; and
- indicating the available energy.

17. The method according to claim 16, wherein the plurality of first parameters indicate:
- a sequence of operation of the plurality of one of subsystems and functions; and
- a forecasted power requirement for operating each of the plurality of one of subsystems and functions.

18. The method according to claim 16, wherein the second parameters indicate:
- a charging/discharging rate for each of the plurality of batteries;
- a relative discharging rate for each of the plurality of batteries; and
- a remaining life for each of the plurality of batteries.

* * * * *